United States Patent
Jones

(10) Patent No.: US 7,788,027 B2
(45) Date of Patent: Aug. 31, 2010

(54) APPARATUS FOR AND METHOD OF PREDICTING A FUTURE BEHAVIOUR OF AN OBJECT

(75) Inventor: Alan Henry Jones, Histon (GB)

(73) Assignee: Cotares Limited, Cambridgeshire (GB)

(*) Notice: Subject to any disclaimer, the term of this patent is extended or adjusted under 35 U.S.C. 154(b) by 792 days.

(21) Appl. No.: 11/574,625

(22) PCT Filed: Sep. 6, 2005

(86) PCT No.: PCT/EP2005/054386

§ 371 (c)(1),
(2), (4) Date: Mar. 2, 2007

(87) PCT Pub. No.: WO2006/027356

PCT Pub. Date: Mar. 16, 2006

(65) Prior Publication Data

US 2007/0294030 A1    Dec. 20, 2007

(30) Foreign Application Priority Data

Sep. 10, 2004   (GB)   ................... 0420095.2

(51) Int. Cl.
*G01C 21/26* (2006.01)
*G08G 1/123* (2006.01)
(52) U.S. Cl. .................. 701/207; 701/35; 701/301; 705/400
(58) Field of Classification Search .......... 701/207, 701/209, 300, 301, 35, 201, 211; 705/400; 342/357.07
See application file for complete search history.

(56) References Cited

U.S. PATENT DOCUMENTS

| 6,438,472 B1* | 8/2002 | Tano et al. ............... 701/35 |
| 2001/0007089 A1* | 7/2001 | Takeuchi ............... 701/211 |
| 2006/0129310 A1* | 6/2006 | Tarrant et al. ............ 701/201 |

FOREIGN PATENT DOCUMENTS

| EP | 1059508 | 12/2000 |
| EP | 1253401 | 10/2002 |
| GB | 2130374 | 5/1984 |

* cited by examiner

*Primary Examiner*—Tan Q Nguyen
(74) *Attorney, Agent, or Firm*—Patterson & Sheridan, L.L.P.

(57) ABSTRACT

An apparatus is provided for predicting the future behavior of an object such as a vehicle. A location and time determining system, such as a GPS receiver (6), determines the geographical location of the vehicle and the current time and supplies this to a processor, such as a computer (1) with a program memory (2). The processor periodically records the location and time to form a record of sightings of the vehicle. The processor (1, 2) compares a sequence of recent sightings with earlier recorded sightings from the record to find matching sequences which represent journey segments which match over a predetermined minimum distance. The processor (1, 2) retrieves some of the sightings which follow the matching sequences and derives from these a prediction of the future behavior, for example possible future routes and destinations of the vehicle.

31 Claims, 6 Drawing Sheets

APPARATUS FOR AND METHOD OF PREDICTING A FUTURE BEHAVIOUR OF AN OBJECT

The present invention relates to an apparatus for and a method of predicting a future behaviour of an object, for example a vehicle. The present invention also relates to a program for controlling a computer to perform such a method, a carrier medium carrying such a program, transmission across a communication path, such as a data network, of such a program, and to a computer programmed by such a program.

Marmasse and Schmandt "A User-centred Location Model", Personal and Ubiquitous Computing, 2002, vol. 6, pp 318-321, Springer-Verlag London Limited disclose a system for learning frequented places by noting locations where a vehicle or user has often been stationary for some while. A user is then invited to name such a place, at which time it becomes a candidate for prediction. There is also a training phase, where it appears that the journey models in use are fed with trial journeys already classified by researchers as the route to which they belong. This is a phase which requires much user intervention, including associating trial runs of a route with its particular model, and is not appropriate for an automated system. The training data for each route is used to train a variety of models, such as a Bayes Classifier, Histogram Modelling and a Hidden Markov Model.

US 2002/0161517 A1 by Pioneer discloses a system for predicting a destination using the following: (a) those destinations that a user has entered in the past, (b) a road mapping database, (c) the recent history of the current journey, and (d) a travel information database built by matching past journeys against the road mapping database. It only begins to record the route used to a destination once such a destination has been identified. It therefore generally requires user intervention to identify destinations before it can be of use. There is a suggestion that the system could detect a position where the engine of a vehicle is stopped regularly and record that as a destination point. After that time, if the user selects that point as a destination, then the system could learn a route to it and begin to predict it automatically. However, the user still has to select that point manually as a destination at some stage.

EP0967460 A1 discloses a system for learning a commute route, that is, a single route along which the driver travels most frequently. It requires the user to enter a time window during which the commute is made, or uses a default time setting, and then attempts to deduce the commute route by storing the route most recently used, by storing a composite route whose derivation is undefined, or by counting how many times each road segment from a mapping database is traversed during that time window and using the most frequently traveled road segments as the commute route.

According to a first aspect of the invention, there is provided an apparatus as defined in the appended claim 1.

Other aspects and embodiments of the invention are defined in the other appended claims.

It is thus possible to provide an arrangement which records and retains sequences of sightings of an object and matches recent sequences with stored sequences so as to derive information which allows a prediction of the future behaviour of the object to be made. The matching process may be expressed as performing one-dimensional matching in two-dimensional data, at least in its most general form. Known systems, for example as described herein before, do not retain records of sightings and do not perform such matching. The present technique thus permits more refined predictions of the future behaviour of the object to be made. Where additional data are stored with each sighting, more varied predictions may be made. For example, such predictions may extend beyond simply making predictions of future movements or locations of the object.

The invention will be further described, by way of example, with reference to the accompanying drawings, in which.

Figure 1:
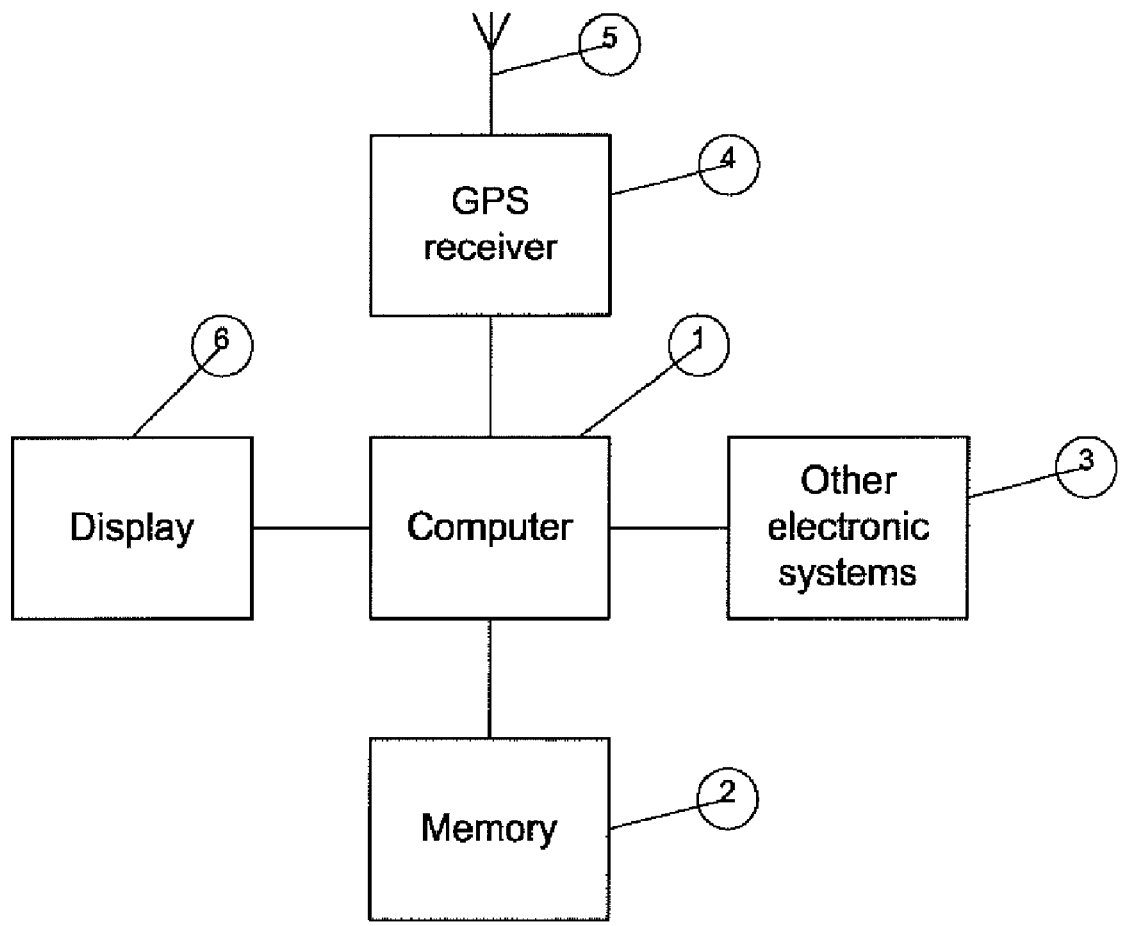
FIG. 1 is a block schematic diagram illustrating an apparatus constituting an embodiment of the invention.

The following is a glossary of terms used hereinafter with explanations of their meanings.

A break in the motion represented by a sequence of sightings is a period of time over which the locations represented by the sightings are not changing significantly. There may be a small amount of drift caused by the error characteristics of a positioning system, or there may be no sightings at all if they have been suppressed or the positioning system has been powered down.

An external position is used to describe where some object is to be found, or some event takes place, in some outside coordination system. It may be given in terms of a map projection grid such as Universal Transverse Mercator (UTM), with or without altitude, or in terms of latitude and longitude to some datum such as the World Geodetic Standard 1984 (WGS84), or in a rectilinear coordinate system such as WGS84 Earth Centred Earth Fixed (ECEF).

GPS is the United States Global Positioning System, one of several satellite navigation systems that enable the position of an antenna to be found to within a few meters under good signal conditions. It also provides time information to an accuracy of better than 1 microsecond.

GPS time is an absolute time standard which tracks Universal Time Coordinated (UTC), one of the observational time standards based on the daily rotation of the earth. It differs from UTC by up to 1 microsecond, but is calibrated against it to better than 200 ns. As it is not adjusted for the rotational period of the earth around the sun (leap-second adjustment), it also differs from UTC by the addition of a small integer number of seconds. The unadjusted atomic timescale from which UTC and GPS time obtain their measure of the second is called TAI (International Atomic Time), so TAI minus GPS time is very close to a constant integral number of seconds, which was the 19 second time offset between TAI and UTC when GPS time began in 1980.

A journey is a sequence of sightings between two significant locations that form the ends of the journey. In this system, we define journeys as sequences of sightings between significant breaks. Whether a break is considered significant is defined by the particular algorithm and parameters in use, but we generally set the parameters to exclude short breaks within longer periods of motion. With appropriate settings, a three hour period of driving with a one hour break to eat in the middle will be considered as a single journey, but a fifteen minute trip to shop for fifteen minutes, followed by a fifteen minute journey home would be consider to be two separate journeys.

The location of an event is its position expressed in the coordinate system in use. For example, we use latitude, longitude and altitude in the WGS84 datum expressed as floating point values. The use of altitude is optional, but can be used to enhance various features of the software if present.

A sighting is a record of the location of an object together with the time at which it was detected at that location.

A sighting array is a sequence of sighting records stored in an array.

A sighting index is an integer specifying an element of a sighting array.

A point is a specially selected sighting index, where the location of that sighting is known to map to a particular pixel on a display screen, or has been selected by other criteria such as proximity to a given location or time. Many points may be mapped to the same pixel, and not all locations in a database may be shown as points, for example, if only sightings taken in the last year are displayed. The user may select points using a mouse, cursor keys or other input means, and the software can determine which locations correspond to those selected points.

A set of points is a collection of points where the order of the points and any duplicates are not relevant. They may as well be sorted into ascending order and duplicates eliminated if this allows for more efficient processing.

A list of points has a defined ordering of its own, and duplicates may be significant.

WGS84 is the World Geodetic System of 1984, and is the primary coordinate system used by GPS. It is a rectilinear coordinate system defined by adopting coordinates for stations around the globe such that the origin of the system is close to the centre of mass of the earth (to within a few meters), thus making it particularly useful for satellite based systems such as GPS. Such coordinate systems are called Earth Centred Earth Fixed (ECEF). If there are major disturbances such as movements along geological fault lines, then station coordinates can be adjusted to avoid discontinuities in the overall coordinate system. The z axis is aligned with the rotational axis of the earth as defined by the International Earth Rotation Service, and the x and y axes are defined by reference to an adopted meridian close to the Greenwich meridian. There is also an associated ellipsoid so that coordinates can be expressed as Latitude, Longitude and Altitude in the WGS84 datum.

FIG. 1 shows an apparatus in the form of a computer 1 with a program memory 2, such as a ROM, flash memory, a hard disk drive, and/or an optical disk drive, installed in a vehicle such as an automobile. However, embodiments of the invention are not limited to use in vehicles and may be attached to or installed in other objects. For example, such an apparatus may be installed in a cellular or mobile telephone, for example of the type which receives information about its geographical location and about the current time.

The vehicle comprises vehicle electronics 3, which monitor and control many of the systems on board the vehicle. The computer 1 is thus able to receive information about various aspects of the current state of the vehicle as described hereinafter.

The vehicle is further provided with a GPS receiver 4 for determining the location of the vehicle and the current time from signals received from the GPS via an aerial 5. This information is also supplied to the vehicle electronics 3, for example so as to provide the function of a satellite navigation or "Sat Nav" system.

The computer 1 is also provided with an output device 6 for providing a human-perceivable output of the predictions of future behaviour of the vehicle which the computer 1 makes. The output device 6 is illustrated in the form of a display, for example forming part of the Sat Nav system or of an in-vehicle entertainment system, but may alternatively or additionally comprise an audio output device such as a loudspeaker.

Although the computer 1, the program memory 2 and the receiver 4 are shown as separate items in FIG. 1, they may be embodied by a single apparatus which may also include the display 6.

In use, the computer stores a record of sightings of the vehicle and processes such sightings, optionally together with further information about the vehicle state from the vehicle electronics 3, in order to present to a driver one or more predictions as to the future behaviour of the vehicle. The record of the sightings forms a log of the past and current journeys of the vehicle, the sightings comprising at least <location, time> tuples. These may be further augmented with other information, such as the ignition key used, the seat memory in use, the doors used, window positions, mirror positions, transmission settings, seat occupancy or weights, entertainment channel selected, incoming or outgoing telephone calls, external and internal temperature, axle loadings, rain sensor output, towbar usage, traffic reports, pollution levels, and ventilation or air conditioning settings. Such information is processed by the computer 1, for example to output predictions of possible destinations, routes, speed, stops, breaking, acceleration, cornering, and any of the additional information forming part of the journey log. Other parameters may be computed from such predictions, such as fuel consumption, distraction level and tiredness. The predictions are based upon matching of the most recent sightings with sequences of sightings in past journey logs using both spatial and temporal data to identify matches. The matching may also take into account any of the additional data mentioned above, such as the ignition key used, the number of passengers or the settings of entertainment equipment, when these are made available to the computer 1 from the vehicle electronics 3.

When the apparatus is installed in a vehicle and commissioned, it starts to record information about vehicle journeys. This is done by recording the location of the vehicle from the on-board GPS receiver 6 at frequent intervals, particularly while the vehicle ignition is switched on. A location update rate of one location per second is generally adequate for this application and a location accuracy within 50 meters (50 m) is commonly available. We record the location as latitude, longitude and altitude to better than 1 m precision, using the WGS84 datum. This is a good globally defined coordinate system, but most other two or three dimensional coordinate systems would suffice, such as WGS84 Earth Centred Earth Fixed (ECEF), Ordnance Survey Grid, or Universal Transverse Mercator (UTM).

The altitude is not necessary for many applications, and is not sensed by some location systems. For such applications, a coordinate system where it can be omitted is preferable. When present, it can be used to:

extend some of the two-dimensional matching algorithms described hereinafter to three dimensions;

give extra feedback to the user, for example, by distinguishing gradients and overpasses; and analyse aspects of routes traveled in three dimensions.

The use of altitude becomes more important if the vehicle itself is not constrained to travel on the surface of the earth, such as an aircraft.

We also record the time at which the vehicle was at each location. The combination of location, altitude when used and time is called a sighting. The time is stored as the number of seconds within the current week as a single precision floating point number and each series of sightings is stored in files whose name identifies the day on the Julian calendar, so that it is a simple task to compute the absolute time of any sighting. The time base used is GPS time, which tracks the international time standard UTC but does not include the leap seconds so that calculations are simplified. Other time systems such as UTC or TAI could equally well be used. While the absolute accuracy of the GPS positions is usually around 10 m, we do record them to a higher precision (1 m) so that we can take advantage of their better relative error and do not add large quantisation errors when computing data such as speeds.

The number format used is IEEE 754 single precision and we add an extra byte (newline 0x0A) as a check at the end of each sighting record to help detect if any file has become corrupted or is in the wrong format. Each sighting takes 17 bytes as follows:

Bytes 0-3: WGS84 Latitude in radians (referred to as lat)
Bytes 4-7: WGS84 Longitude in radians (referred to as lon)
Bytes 8-11: WGS84 Altitude in meters (referred to as alt)
Bytes 12-15: GPS time of week in seconds (referred to as time)
Byte 16: 0x0A (referred to as separator)

With the continuing decrease in storage costs and the increase in accuracy of common positioning systems such as GPS, other implementations might choose to use double precision floating point formats, integer formats based on microradians or millidegrees of latitude and longitude, or even ASCII formats such as degrees and decimal degrees used by NMEA 0183.

Sequences of sightings are stored in files whose names follow the convention "yymmddxx.pat" where yy are the last two digits of the year, mm is the index of the month, dd is the day within the month, and xx is an incrementing alphabetic field used to distinguish multiple files recorded on the same day. The file name is chosen at the time of the first sighting in the file. For example, files 030821AA.pat and 030821AB.pat would be the first two files that began on 21 Aug. 2003.

Sightings are stored into these files automatically whenever the vehicle ignition is switched on, and a new file is begun each time the engine is started. If power allows, sightings could also be stored when the ignition is switched off to cover situations such as car ferry journeys or to confirm that the system has not missed any movements. In this case, it would be convenient to start a new file at least each day, and perhaps every hour. The reason for storing the sightings in multiple small files is to allow subsets of them to be easily selected for opening, backup or communication, to give some resilience against disk or filing system failures, and to allow computer systems with limited resources to be able to manipulate them easily.

Other implementations could choose to store all of the sightings in a single file, perhaps under the control of database software. Other information could also be stored in these files, such as the registration number of the vehicle that the sightings refer to, the name of the driver, external events such as traffic reports, weather conditions or indeed anything that may be relevant to the later processing of these sightings. To keep this explanation simple, we will consider the case of sightings files that just contain latitude, longitude, altitude and time information.

Other events can be stored in external files and associated with these sightings by their position in a directory hierarchy (for example by grouping all of the files of sightings for some particular vehicle in a directory named by the registration number of that vehicle), or by the time of the sighting (for example by recording the time that a particular driver started and stopped a vehicle and then finding the sightings closest to those times).

To begin with, the files of sightings are sorted into ascending time order and then the locations are extracted from each file in that order into a single ordered list. As part of the extraction process, the sightings are bounds checked to ensure that all values lie within sensible limits and, if any do not, the entire contents of the file are left out of the list and an error report is generated. Also as part of the extraction process, the time of a sighting stored in the list is expressed as the number of seconds since the beginning of GPS time on 1 Jan. 1980 so that the original file name is no longer relevant.

Next, the single list is sorted so that the time of each successive sighting is greater than or equal to its predecessor. This sorting operation is quite efficient because the bulk of the sorting is performed by sorting the files by their names before the points are extracted. The sorting of the points themselves is necessary in case files have been brought together from different systems such as vehicle tracking or mobile phone tracking, or in case clocks have been adjusted. This also provides a further check on the integrity of the data as we can now reject sequences of sightings that lie outside reasonable bounds on earliest and latest sightings and on the basis of speed between two successive sightings in time.

Figure 2:
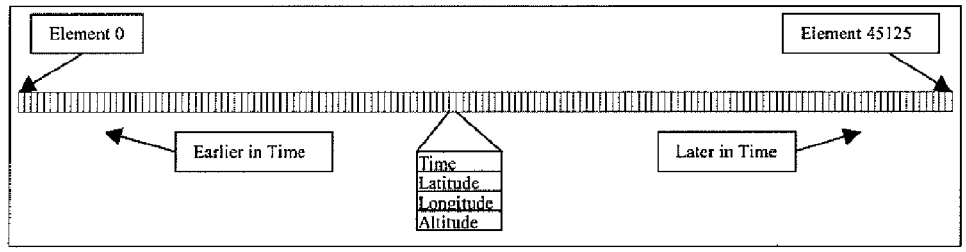
FIGS. 2 to 5 are diagrams illustrating recording of sightings and analysis to determine journeys and journey segments.

When we use the terms "previous sighting" and "next sighting", we are referring to the position within this single ordered list. This list may be stored on disk or in memory as one single sequence of bytes containing the lat/lon/alt/time/separator sequences back to back, or as separate sequences of lat, lon, alt and time, or as data structures such as arrays or lists of sightings, latitudes, longitudes, altitudes and times. The detailed choice of storage format is determined by the particular computer configurations upon which the software is to be run, but always supports the basic operation of retrieving the sightings sequentially by index or pointer, so that the index or pointer may later be used as a reference to retrieve the sighting information. The format that we use in memory is an array of structures (records). Each structure contains the latitude, longitude, altitude and time of a particular sighting. The array is sorted into time order as described earlier, with the first element (element 0) being the earliest sighting, and the last element being the latest sighting in the sequence. A structure of this type is illustrated in FIG. 2.

A journey is some sequence of sightings between two significant events, such as first leaving home in the morning and later arriving at work. There is no single definition of what constitutes a journey; it depends on the user and the context and how the journey information is going to be used. If the vehicle is stationary for some period of time, we call this period a "break period" and identify the first and last sightings in the break period as the end and beginning of the respective surrounding journeys.

One simple journey definition that works for vehicles is to use the time that the ignition of the vehicle is switched on as the start of a new journey, and the next time that the ignition is switched off as the end of that journey. We may be able to detect and timestamp the actual turning on and off of the ignition by allowing a computer to sense the state of the ignition circuits or the ignition key position. Alternatively, the positioning system may be arranged to only generate sightings while the ignition is turned on, so a long time period with no sightings could be taken to indicate a break between journeys. It is also possible that the processor that is storing the sightings is only powered on while the ignition is on, and this again would allow us to interpret a long time period with no sightings as a break between journeys.

Another definition, which works for systems where the positions are generated even while the ignition is switched off, is to look for periods where the vehicle makes very little or no progress. Here, we search for a sequence of sightings where the velocity of the vehicle (as measured directly or by computing the speed between two successive sightings) stays below some threshold determined by the maximum possible error velocity that might be measured for a stationary vehicle (e.g. 1 mph) for some period (e.g. over 1 minute) as the break between journeys, marking the first sighting in the sequence as the end of a journey and the last sighting in the sequence as the start of a journey. This has the advantage of potentially identifying short journeys where the ignition may not be switched off, such as when the driver waits while someone delivers a parcel, not breaking journeys where the ignition is switched off for just a short time, such as while waiting for a train to pass at a level crossing, and not being reliant on the proper detection and recording of the ignition state.

In case the vehicle is moving very slowly for a prolonged period, an improvement on the velocity-based heuristic is to mark all periods in the sequence where the vehicle remained within some error margin (typically 50 m) of the same position for more than some period of time (call this Bmin, typically three minutes), or where there is a gap in the sightings with a time interval of greater than Bmin.

The algorithm used to identify the breaks will be dependent on the properties of the particular positioning system in use. For example, a GPS system might produce a sighting every second regardless of progress. In this case, a vehicle would have to move faster than 110 mph (180 km/h) to cover 50 m between successive sightings, so to identify breaks, we have to look across a number of sightings.

A suitable algorithm is to look at sequences of sightings spaced Bmin apart in time, to see how far the vehicle had moved in that time; and an example is as follows.

Step 1: Call the earliest sighting SightingA and set SightingX equal to SightingA.

Step 2: For each SightingA, find the furthest subsequent sighting for which the time of that sighting is less than 3 minutes from the time of sightingA. Call that SightingB.

Step 3a: If SightingB is less than 50 m away from SightingX, then mark all the sightings from SightingA to SightingB as part of a break period, leave SightingX unchanged, and make SightingA the next sighting after SightingA.

Step 3b: If SightingB is more than 50 m away from SightingX, then do not mark any break sightings, and make the new SightingA and the new SightingX the next sighting after SightingA.

Step 4: If SightingA has not reached the end of the list of sightings, then repeat from step 2; otherwise, the marking of all break periods has been completed.

Figure 3:
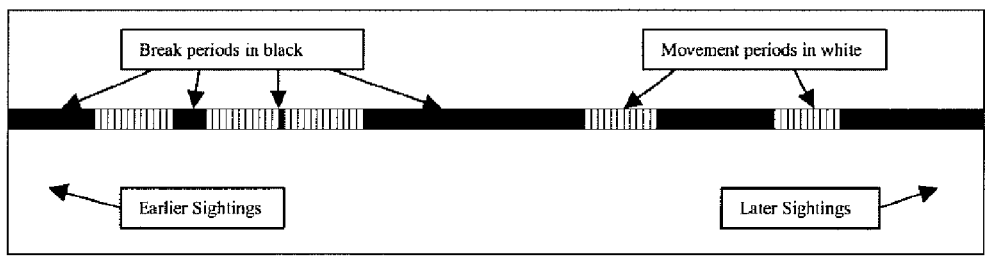

This algorithm could mark a long break even when the vehicle was moving very slowly (less than 50 m in three minutes or about 0.6 mph (1 km/h)), so this would also be considered to be a potential break between journeys. An example of marked break periods is show in FIG. 3.

If a different behaviour was required, or depending on the drift and dropout characteristics of the particular positioning system in use, then various modifications to this algorithm could be used.

Figure 4:
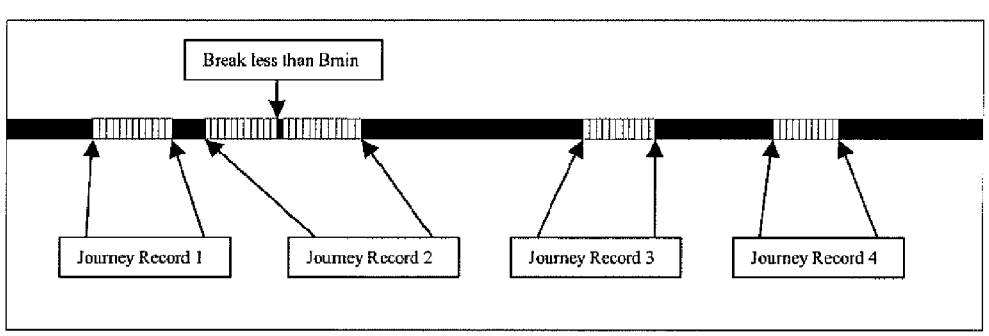

Now that we have identified potential break periods, we create a journey record for each period of movement between the break periods. This journey record contains a reference to the sighting just at the end of the first break period, and a reference to the sighting just at the beginning of the next break. These are the begin and end references for the journey record. Such a journey labelling is show in FIG. 4.

We now want to determine which of those breaks are significant to the application for which we are computing them.

Figure 5:
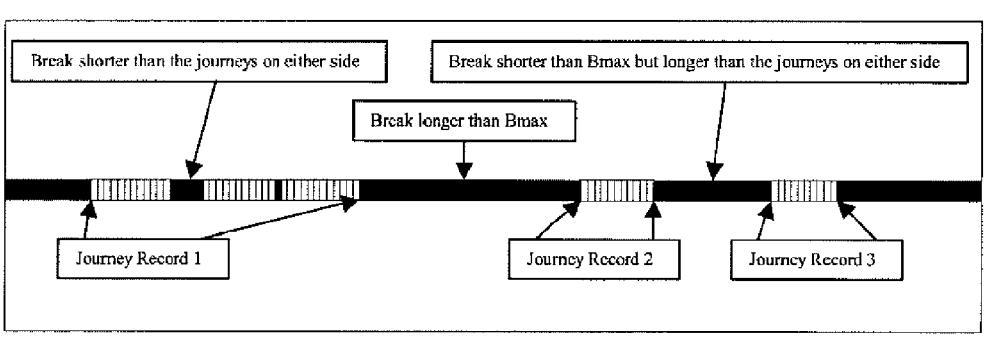

We consider each break period in turn, starting with the earliest in time and working through to the latest in time. If the length of time of a break period is less than the length of time of the journey preceding or succeeding it, and less than a certain threshold (call this Bmax, typically thirty minutes), then we merge those journeys into one new one on the grounds that this was a temporary stop in the midst of a longer journey. This is illustrated in FIG. 5.

For example, a sequence of five minutes of driving followed by a six minute stop followed by five minutes of driving would be considered to be two distinct journeys, perhaps going out specially to fill a car with petrol or pick up something at nearby shops. A sequence of one hour of driving followed by a six minute stop followed by a half hour of driving would be considered to be all one journey, perhaps stopping for petrol or a snack on the way to somewhere else.

We repeat the merging process until all the break periods of less than the Bmax threshold are flanked by at least one journey of shorter length than the break period.

There are many similar heuristics that could be used to identify journeys, and in some applications, it may be advantageous to tailor the definition of a journey to the particular requirements of the application, for example by using a different heuristic or by adjusting the parameters such as Bmax and Bmin.

Figure 17:
FIG. 17 is a diagram illustrating journey analysis.

For example, FIG. 17 shows a map view of many sightings, with the first ten and the last ten sightings of each identified journey being highlighted by using larger black dots.

Once the journeys have been identified, we create a record in the computer for each one. This record refers to the sightings in the main list that begin and end the journey. These sightings contain the positions and times of the start and end of the journey. We further augment each journey record with the latitude and longitude of the smallest bounding box that includes all of the points in that journey. This information is used to speed up many algorithms that search or display the past journeys.

Another useful optimisation is to compute the cumulative distance of each sighting from the earliest sighting (called sighting0) when the entire list is first sorted. In this way, the cumulative distance from some sightingX to sightingY can be found by subtracting the cumulative distance from sighting0 to sightingX from the cumulative distance from sighting0 to sightingY, thus saving many small computations.

The speed and acceleration represented by each portion of the sequence is also useful in further computations and display, and also as a check on the validity of the observations. We compute speeds and accelerations for every group of five points and check that these lie within certain bounds of validity given the capabilities of the vehicle and the inherent error characteristics of the sensor system. Where the points lie outside the valid bounds, for example, if the speed is greater than 150 mph (240 km/h), or the acceleration is greater than $10\,\mathrm{ms}^{-2}$ over a distance greater than the known instantaneous error of the positioning sensor, then we will reject these five points and also a number of points before and afterwards, typically one minute's worth. For those points that remain, we may choose to keep the speeds or accelerations cached in the computer memory or stored on disk with the validated points for use in later computations.

Matching is the process of finding past behaviours of the vehicle, other vehicles, or pre-loaded exemplar behaviours that resemble the recent behaviour of the vehicle in certain ways. There are many different algorithms that could be used to find such matches, so two examples are given here, one tight and one loose. The loose algorithm looks back a certain distance (for example, 500 m) in the current journey and then finds past journeys where the vehicle has moved from that position to its current position while travelling 500 m+−10%.

The tight algorithm also looks back in the current journey a certain distance and then finds past journeys where the vehicle has move from that position to its current position while remaining within a certain error margin (say 50 m) of the recently recorded track. This is capable of picking up detailed differences between tracks, perhaps because of differences in the use of roundabouts versus overpasses, local roads versus motorways, or even different lanes of a multi-lane highway.

Both matching algorithms begin by taking the most recent sighting (called sightingB), and then looking successively further back in the recent sequence of sightings, accumulating the distance traveled from each sighting to the next, until the first sighting is found for which the distance traveled exceeds, say, 500 m. Call this sightingA. Now we have effectively selected the sightings from the most recent 500 m of travel. The 500 m is chosen to cover a stretch of road well above the accuracy of the positioning system in use and sufficient to cover the traversal of most junctions. We shall call this distance the matching distance M. It can be varied according to how accurate we want the match to be, the characteristics of the vehicle and positioning systems, or even the number of matches found.

The loose algorithm ignores the intermediate positions, just using the start and end sightings of the last M meters of the current journey. We look back in the sequences of recorded sightings, starting at sightingA, and working backwards in time searching for a sighting whose position is within some error margin, typically 100 m, of the position of sightingB. Call this stage of the algorithm stageX.

When such a sighting is found, we then work further back looking for the first sighting that is outside another error margin, typically 100 m, of the position of sightingB. Call this candidateB.

We then work backwards, accumulating the distance traveled between sightings, until we reach a sighting that has an accumulated distance greater than 0.9*M from candidateB. This is our first candidateA.

Figure 6:
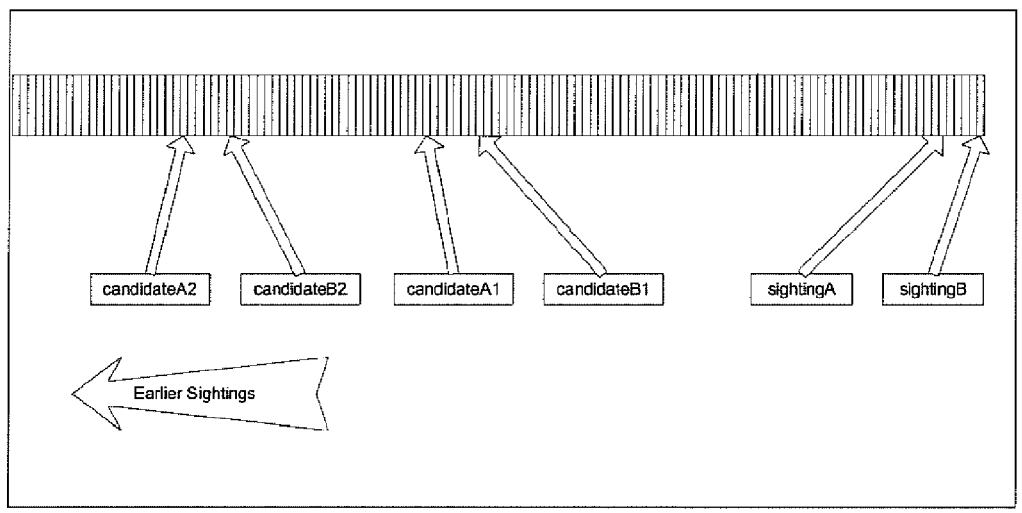
FIGS. 6 to 8 are diagrams illustrating a first technique for determining matches between journey segments.
Figure 7:
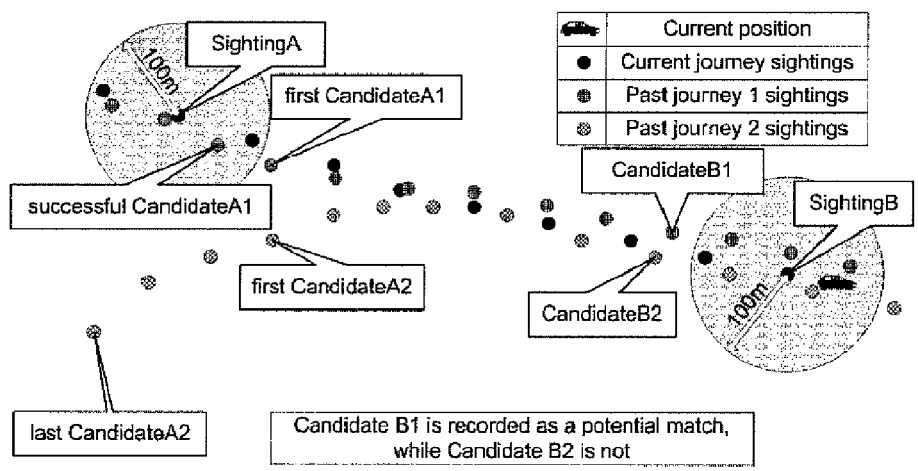
Figure 8:
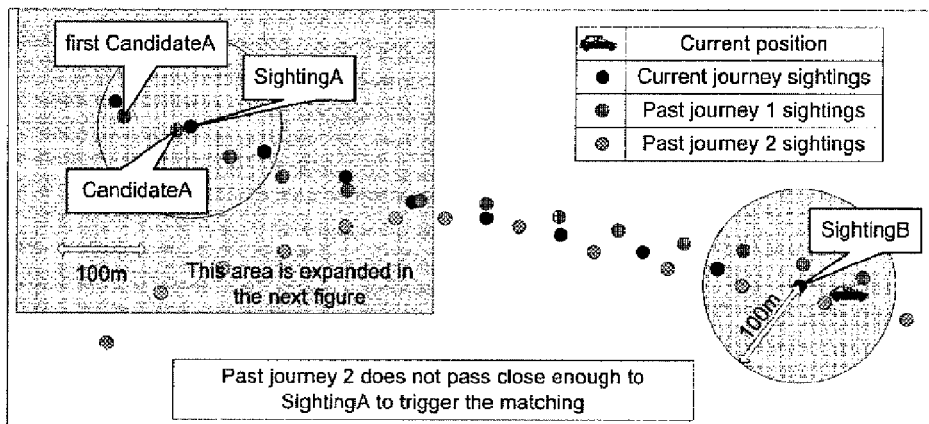

We see if the position of candidateA is within an error margin, typically 100 m, of the position of sightingA, and if it is, then we record candidateB as a potential match to our present position and recent behaviour. Such pairs are shown in the FIGS. 6 and 7 as candidateB1 and candidateA1 and, for a later iteration, candidateB2 and candidateA2.

If candidateA is not sufficiently close to sightingA, then we move successively further back in the sequences of recorded sightings, making each sighting the new candidateA, until we either find one where the position of candidateA is close enough to the position of sightingA and record candidateB as a potential match, or until the accumulated distance is greater than 1.1*M, in which case we conclude that candidateB is not a potential match.

In either case, we then begin again by looking backwards from candidateB in the sequence of sightings until we find one whose position is within some error margin, typically 100 m, of the position of sightingB.

We then repeat the process described above from stageX.

The algorithm terminates when we have either found sufficient potential matches (typically 1000), or have worked back as far as the earliest recorded sighting.

In summary, this algorithm has found the records of the last M meters of the current journey, taken the start and end sightings (sightingA and sightingB), then looked back in the records for sightings candidateA and candidateB where candidateA is near sightingA, candidateB is near sightingB, and the distance traveled from candidateA to candidateB is M meters plus or minus 10%. It has repeated the finding of such candidateA and candidateB sightings until the records were exhausted or sufficient had been found. It has made a list of the candidateB sightings, called the matchlist, and we call this stage of the algorithm stageY.

The tight matching algorithm operates in similar fashion, except that it looks for a sequence of sightings between candidateA and candidateB that do not stray more than some error margin R from the sequence of sightings from sightingA to sightingB.

This algorithm operates by first finding the earliest sighting close to sightingA, called candidateA. We then move two pointers forward in time from sightingA and candidateA such that we keep the distance between those pointers to a minimum by choosing to move whichever pointer keeps the two pointers closer together. The pointers are called pastP and currentP respectively, because pastP is moving between candidateA and candidateB in the past sightings, and currentP is moving between sightingA and sightingB in the most recent sightings. If both pointers reach their respective end points (sightingB and candidateB) without moving further apart than the error margin R, then we have found a trail in the past from candidateA to candidateB that has closely followed the recent trail from sightingA to sightingB, so we record the index of candidateA on a list of the indices of the start of possible matches. If the pointers move too far apart at any stage, then we abandon the matching and do not record this candidateA on the list.

We then find a new candidateA by moving forward from the last candidateA until we move sufficiently far from sightingA to consider that we have left the previous trail behind, and then look for the next sighting that is close to sightingA again. This becomes the new candidateA.

The algorithm may be enhanced by allowing the locations referenced by the pointers pastP and currentP to move apart in a controlled manner when there are breaks in the sightings as might be caused by a temporary loss of location information due to a tunnel or other obstruction, interference from other systems, or temporary power loss. They are allowed to move further apart for one or two updates of pastP or currentP, but then must move consistently closer together even though they may stay apart by more than the error margin for some considerable time.

In the enhanced tight matching algorithm, we start at the beginning of the recorded sightings and search forward for a sighting whose position is within some error margin of sightingA. This becomes candidateA.

We call this stage in the algorithm stageZ.

We repeatedly look at the sighting after candidateA, and if it is closer to the position of sightingA, then we make that the new candidateA. Now we have a candidateA that is closer to sightingA than the sightings before or after it. If candidateA moves so far forward in time that it reaches sightingA itself, then we have found all the possible matches and this phase of the algorithm is finished and we move on to the filtering.

Now we want to know if we can follow a trail of sightings from candidateA forwards until the position is within some error margin of sightingB, while always remaining close to the trail from sightingA to sightingB.

We do this by moving pointers forward along both the past trail (from candidateA) and current trail (from sightingA) while keeping the distance between the pointers short. Call the pointers pastP and currentP respectively. If currentP reaches sightingB, then we have found a match, and we add pastP to the list of possible matches, the matchlist.

Initially, pastP points to candidateA, and currentP points to sightingA. We compute two distances, movePastD and moveCurrentD. movePastD is the distance between the sighting after pastP and sighting currentP, that is, the distance that there would be between pastP and currentP if we moved pastP to point to the next sighting after itself. moveCurrentD is the distance between the sighting pastP and the sighting after currentP, that is, the distance that there would be between pastP and currentP if we moved currentP to point to the next sighting after itself.

If movePastD is less than or equal to moveCurrentD, then we move pastP. To do this, we update pastP to point to the sighting after pastP.

Alternatively, if movePastD is greater than moveCurrentD then we move currentP by updating currentP to point to the sighting after currentP.

Figure 9:
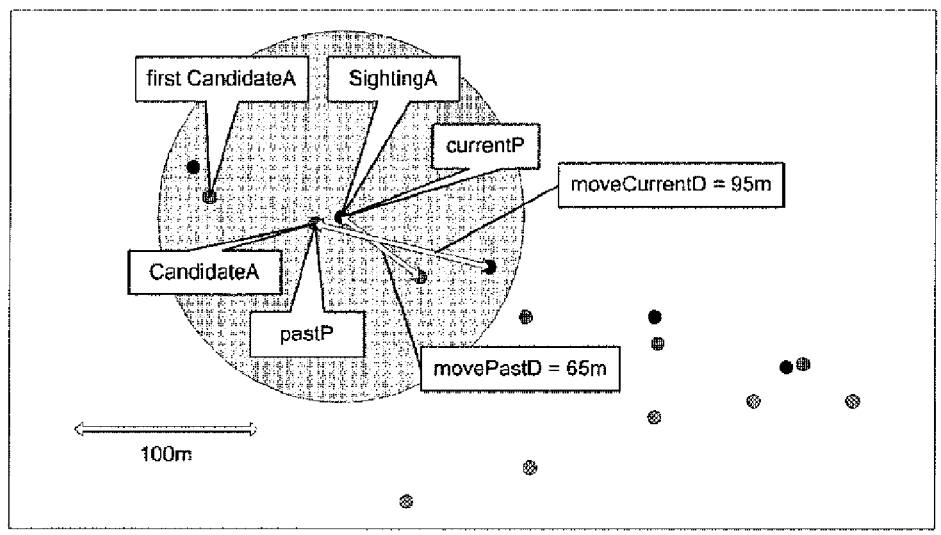
FIGS. 9 to 16 are diagrams illustrating another technique for matching journey segments.
Figure 10:
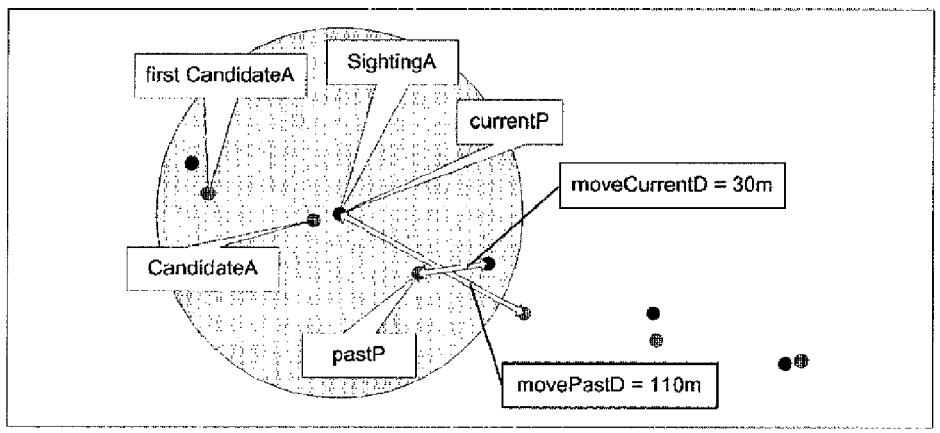
Figure 11:
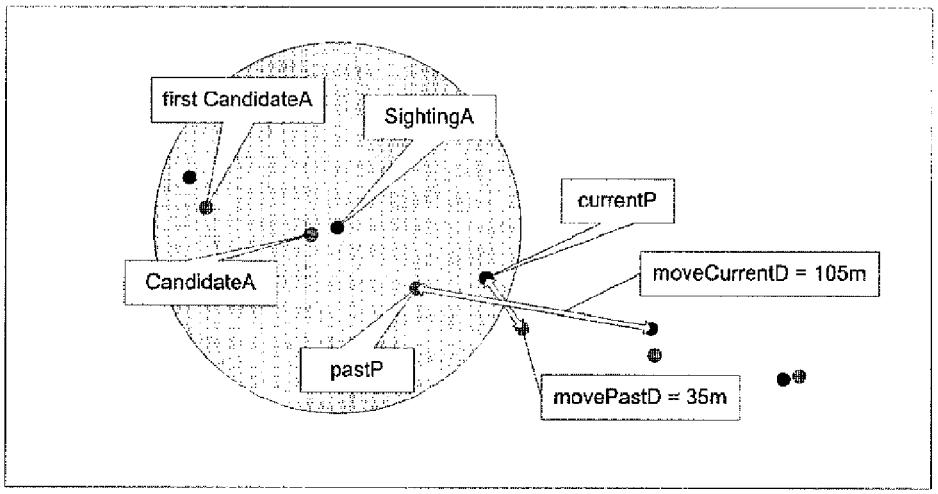

In this way, we try to keep the distance between pastP and currentP as small as possible. FIGS. 9 to 11 illustrate the way in which the pointers would update in a typical scenario.

In FIG. 9, as movePastD is smaller, we update pastP and recompute to give FIG. 10. As moveCurrentD is smaller, we update currentP and recompute to give FIG. 11.

The distance between pastP and currentP will vary as we go, sometimes becoming smaller, and sometimes greater. So long as it is less than some error margin (typically 50 m) then we continue the matching. If it becomes greater than the error margin, we do not immediately abandon the match. The reason for this is that sometimes there may be gaps in the sightings, for example when the vehicle has traveled through a tunnel or under trees, which cause the distance to exceed the error margin because one trail has sightings over a stretch of road when the other trail does not. To account for this, we do not abandon the match until the distance between pastP and currentP has been greater than the error margin and has been growing for the last N updates. N is typically set to 2. Thus, the distance could suddenly grow to 200 m and remain greater than the error margin for the next 20 updates, but so long as it did not grow for two successive updates, it could still be allowed as a match between the trails.

Figure 12:
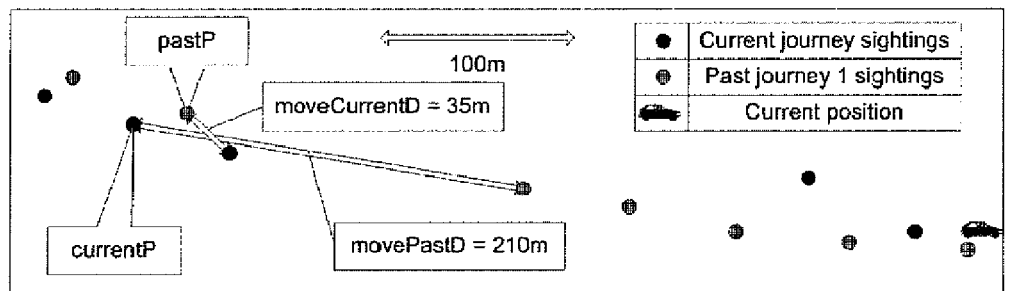
Figure 13:
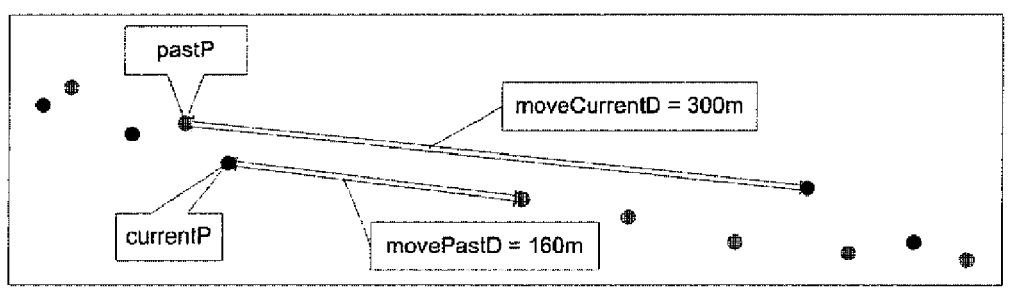
Figure 14:
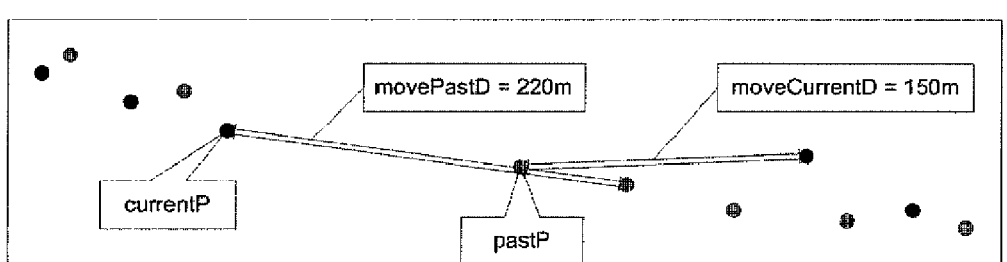
Figure 15:
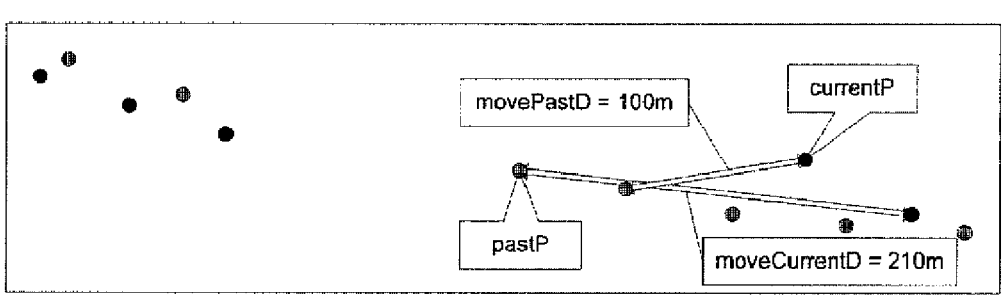
Figure 16:
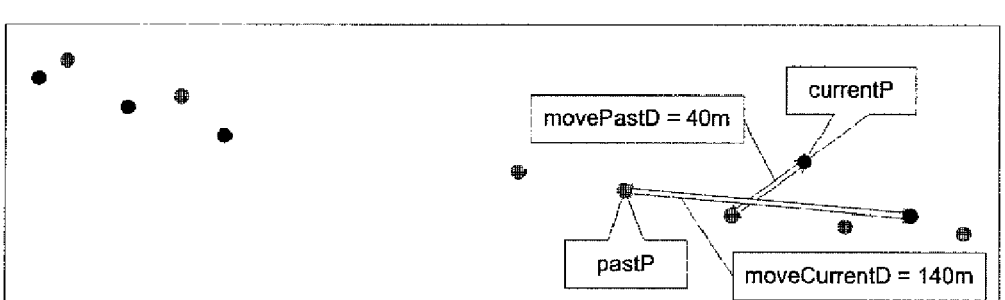

In FIG. 12, because moveCurrentD<movePastD, we move currentP to give FIG. 13. Because moveCurrentD>=movePastD, we move pastP to give FIG. 14. Now, the distance between currentP and pastP has exceeded the threshold (50 m), so we will only allow it to increase a further N−1 times. If N=2, then it can only grow once more. Because moveCurrentD<movePastD, we move currentP to give FIG. 15. Now, the distance between currentP and pastP may have grown again, so it will only be allowed to grow a further N−2 times, in this case, 0 times. If it grows again before shrinking, we will reject this trail for matching. Because moveCurrentD>=movePastD, we move pastP to give FIG. 16. Now, the distance between currentP and pastP is still greater than 50 m, but it has shortened, so we reset the count and it can grow a further N times before abandoning the match. In this particular example, it will not grow again until another dropout is reached. Because moveCurrentD>=movePastD, we move pastP, and pastP comes within 50 m range of currentP once again, so we have successfully negotiated the tunnel dropout.

Many different sequences of dropouts in both trails due to objects such as trees are also overcome in the same fashion.

If we abandon the match or find that currentP has reached sightingB, then we need a new candidateA to start pastP from again. To find this, we look at the sighting after candidateA, and make that the new candidateA. We repeat this until the distance from candidateA to sightingA is greater than the error margin, or until candidateA reaches sightingA, in which case we have found all the possible matches and this phase of the algorithm is complete. If candidateA has not yet reached sightingA, then we continue the matching process from the point stageZ above. If candidateA has reached sightingA then we have completed our list of possible matches (the matchlist) and again call this stageY of the algorithm.

For greater reliance on where the vehicle has come from, the matching distance M can be increased, perhaps to 2 km, or even to the full extent of the current journey.

Usually, the matching distance is used even if it takes sightingA into an earlier journey than sightingB. This has the effect of introducing some dependency on the route that was taken at the end of the previous journey, which may be a useful additional dependency to sharpen the accuracy of the prediction. Alternatively, the matching distance can be reduced in such circumstances to be the distance so far traveled in the current journey, which will include more potential matches, that can be sifted later by the filtering algorithms. This is particularly useful at the very beginning of a journey, as it has the effect of returning a matchlist consisting of all past sightings made around that point, irrespective of the direction of travel, but which will then go on to be filtered by the time of week or time of day. As the journey progresses, then the matching distance will increase, and subsequent matchlists will be more dependent on the route taken so far.

Both the tight and loose matching algorithms can be performed by searching forwards or backwards in the time-ordered list of recorded sightings. They could also be optimised by skipping some of the sightings, which is just as though the location system had used a lower update rate. Different heuristics can also be used to choose the new candidate points, such as insisting that they should be at least d meters from the last considered candidate point. These choices may be made differently to obtain the highest possible number of matches, a set of matches as fast as possible, or even to optimise the interaction of the algorithm with the memory architecture of the computer system on which it is run.

From stageY of either the loose or tight algorithm, we can now apply other filters, such as the time of day, driver information, weather condition etc. to reduce the number of potential matches. For example, we may look to see how many potential matches would remain if we insist that each candidateB is within plus or minus one hour of the time of week of sightingB. If that leaves us with sufficient matches, then we make that reduced list the new list. If there are insufficient matches to the time of week, then we see how many potential matches remain if we insist that each candidateB is within plus or minus one hour of the time of day of sightingB. If that leaves us with sufficient matches, then we make that reduced list the new list.

For journeys that are commonly made but share the same initial route, this time based filtering will help to distinguish them even before their routes diverge. For example, the beginning of a weekday journey at 8 am may match many past journeys to work, while the same beginning at the weekend may match past journeys to the shops or relatives.

We may also filter by the age of the sightings if the matchlist is long enough. In this way, the system will adapt faster to changes in driving patterns due to a change of workplace, schools, etc. Such filtering could also be enhanced by an input from the user when they know that there has been abandonment of old routes. Such age-based filtering may best be applied as weightings on the matchlist at the later prediction stage, so that rare old matches can still be properly taken into account for some applications.

We then take this new list and, if there is driver identification information available, we may look to see how many potential matches would remain if we insist that each candidateB had the same driver as sightingB. If that leaves us with sufficient matches, then we make that reduced list the new list.

We can apply many other filters in this way. The most CPU and memory intensive work is in performing the matching task. There may be advantages in applying multiple different filtering schemes depending on what the application is going to do with the information. For example, if we want to make a journey time prediction, then we should certainly filter by time and favour the most recent journeys, but if we are determining whether a major traffic incident warrants a warning, then we should take into account rare journeys as well as the most recent ones.

With the filtered list of possible matches, we can now look at properties of interest. From each match in the matchlist we can look forwards in the sequence of sightings to see what the ongoing behaviour of the vehicle was in the past. These behaviours can be used as a prediction of the ongoing behaviour of the vehicle from the present time. As an example, if the vehicle is engaged in reporting its position every minute, then we might look forward one minute from each match, and if the positions are within some error margin of each other (typically 500 m), then we can send the average of those positions as the predicted position of the vehicle in one minute's time, along with the present position, saving communication bandwidth and latency. We then only need to send a message every two minutes instead of one. This can be extended to looking two, three, or more, minutes ahead to save even more communication overhead. On the rare occasions when the vehicle strays more than some error margin (typically 500 m) from those predicted positions in the minutes ahead, a further message with the latest position and predictions can be sent to correct the situation.

This function could also be carried out remotely from the vehicle by applying similar matching algorithms from the latest sighting received from the vehicle, although a database of the past sighting history of the vehicle would also have to be maintained remotely, perhaps by occasional downloads.

If we have a means of receiving alerts about abnormal traffic conditions, or perhaps if we have access to a database of usual times and places where holdups occur (troublespots), then we may wish to know if the vehicle is likely to encounter any of them.

We can do this by looking forward from each sighting in the matchlist to the end of the journey that contains it, and for each point in each of those journeys, checking to see if there are any traffic alerts or known troublespots in the vicinity (within 100 m) at about the time (within 30 minutes) that we would reach them based on the time taken to reach them from the matched sighting, or based upon the time predicted by route planning software. If there are such alerts, then we would warn the driver at the next safe opportunity so that they could take appropriate action, and we could also pass this information to other systems such as route guidance or vehicle tracking systems. The route planner could be as simple as a distance divided by average speed calculation, where the distance is known from the matched journeys, or it could be a complete route finding algorithm taking into account road types and predicted traffic levels such as those used by TrafficMaster in their SmartNav system.

If we wish to present the driver with traffic, route, service, telephone call or other potentially distracting information, we may find it useful to look at the ongoing behaviour of the vehicle in the past to find times when there was little acceleration, deceleration, cornering or junctions. If these conditions were met over the same ongoing period P for most of the sightings in the matchlist, then the beginning of that period P in the future would be a good time to present the information to the driver.

Conversely, we may look to see if there was evidence of distraction over some immediately succeeding period (typically the time taken for the driver to absorb the information) for any of the ongoing behaviours in the past. If no such evidence was found, we would immediately present the information. If such evidence was found, we would have to decide if the information is important enough to present anyway, or discard the information as too old to be useful any more, or repeat the process after the next prediction update.

If we wish to predict the destination of the current journey, we may look at the endpoints of each past journey that contains one of our possible matches. Those endpoints can be grouped into clusters by their relative proximity. One algorithm begins by putting each point in its own unique cluster. Then each cluster is taken in order, and each of its points is compared with the points in all other clusters. If any are found to be within P meters of each other, then their clusters are merged. This process of taking each cluster in order is repeated again and again until either all clusters have been merged into one, or no points have been found in different clusters that are within P meters of each other. Other such clustering algorithms are described in computer science textbooks.

We can now look at how many journeys end in each cluster and predict that this journey is going to end in proximity P meters to some point in the cluster with the most endpoints in it. We may then express this as a textual description of the position (by reference to a gazetteer relating areas to their names) or give the average position of the points in the cluster and its maximum extent. Where it is useful, we can construct a list of such predictions from the clusters with the highest numbers of endpoints.

Given the predicted destination, we can then do all of the things that we would do with a user-entered destination. For example, filter traffic information, perform route planning and guidance, estimate journey time and variation. We can do this for the single most populated cluster, or for several of them. We can also present the user with the possibilities, and give them the option to select one or reject them all.

One useful way to display the destination information might be in the familiar form of a road sign, but which has adapted to the previous behaviour of the vehicle. It might give information such as:

| | | | |
|---|---|---|---|
| Birmingham centre | 40 miles | 45 min | |
| Exospan limited | 67 miles | 1 hr 35 min | Delays M6 J12 |
| NEC | 25 miles | 25 min | |

The driver may choose to just watch these information signs, or they could accept or reject particular lines from them by voice or button interfaces. If they accept a line, then it can be set as the known destination, and the vehicle may compute an alternative route or inform other systems. If they reject one, then it can be removed from the display and the journeys containing the matching sightings that generated it can be removed from consideration for the rest of the current journey, thus cutting down on irrelevant traffic alerts, and sharpening the predictions of journey time, driver activity etc.

A useful additional extension is to attempt to match the recent part of the current journey against past sightings, but in reverse time order. Thus if the current journey has moved from sightingA to sightingB, find a past journey segment that has moved from near sightingB (still call this sighting candidateB) to near sightingA (and still call this candidateA). Then we can use what led up to candidateB in the past to predict what may now happen after sightingB.

This reverse route matching works extremely well for the return legs of new routes, where they may never have been traveled in that direction before but nevertheless follow the same roads back as they did on the outward journey. Then, for example, the journey destination may be predicted to be the origin of the outward journey and appropriate traffic information or alternative routes may be given.

Typically, reverse route matching may only be attempted when there are insufficient matches in the forward direction, perhaps less than ten.

To help the system initially when very few routes have been traveled, or to help when a new route is traveled for the first time, we may preload the system with invented sightings along routes recorded from other vehicles or computed from route planning systems. It is particularly effective to have such preloaded sightings for the trunk road network. Such invented sightings can be saved and only used as a last resort if matching to the real sightings has failed to come up with any good matches, or they may be used in every matching cycle but rely on filtering by their age and infrequency to reduce their effect on the predictions as the real sightings build up.

The invention claimed is:

1. An apparatus for predicting a future behavior of an object which comprises a location and time determining system for determining a geographical location of the object and a current time, the apparatus comprising a processor for performing operations comprising:
    (a) periodically recording the location and time, at least during some movements of the object, to form a record of sightings;
    (b) comparing a sequence of recent sightings with earlier recorded sightings from the record to reveal earlier sequences of sightings which match over at least a predetermined distance the sequence of recent sightings such that a journey segment represented by the sequence of recent sightings substantially matches journey segments represented by the earlier sequences of sightings over at least the predetermined distance;
    (c) retrieving some subsequent sightings which follow the sightings of at least some of the matching sequences; and
    (d) deriving at least one prediction of the future behavior from the retrieved sightings.

2. The apparatus as claimed in claim 1, in which the apparatus is arranged to move with the object.

3. The apparatus as claimed in claim 2, in which the apparatus is attached to or forms part of the object.

4. The apparatus as claimed in claim 1, in which the predetermined distance is substantially equal to 500 m.

5. The apparatus as claimed in claim 1, in which the geographical location includes altitude.

6. The apparatus as claimed in claim 1, in which the recent sightings sequence includes a most recent sighting.

7. The apparatus as claimed in claim 6, in which the processor is arranged to perform (b) as soon as the most recent sighting is recorded.

8. The apparatus as claimed in claim 1, in which the processor is arranged to perform (b) for each Nth recent sighting, where N is an integer greater than zero.

9. The apparatus as claimed in claim 1, in which the processor is arranged, between (a) and (b), to analyze the record into distinct journeys.

10. The apparatus as claimed in claim 9, in which each earlier sequence is from a respective single journey.

11. The apparatus as claimed in claim 1, in which, if the number of matching sequences is greater than a predetermined maximum, the processor is arranged to select those matching sequences whose recorded times have a predetermined relationship with the recorded times of the sequence of recent sightings.

12. The apparatus as claimed in claim 11, in which the predetermined relationship is within a predetermined range of a time of day.

13. The apparatus as claimed in claim 11, in which the predetermined relationship is within a predetermined range of a time of day and on a same day of the week.

14. The apparatus as claimed in claim 11, in which the predetermined relationship is within a predetermined range of a time of day and on a same type of day of the week, wherein types of day are weekdays and weekends.

15. The apparatus as claimed in claim 1, in which, if the number of matching sequences is less than a predetermined minimum, the processor is arranged in (b) additionally to compare the recent sighting sequence with earlier recorded sightings in reverse time order.

16. The apparatus as claimed in claim 1, in which a matching sequence is indicated if positions of the first and last sightings of the recent sighting sequence differ from positions of the first and last sightings of the earlier sequence by less than first and second amounts, respectively, and the measured distances traveled via intermediate sightings of the recent sighting sequence and the earlier sequence differ by less than a third amount.

17. The apparatus as claimed in claim 1, in which a matching sequence is indicated if positions of the first and last sightings of the recent sighting sequence differ from the positions of first and last sightings of the earlier sequence by less than first and second amounts, respectively, and nearest pairs of sightings of the recent sighting sequence and the earlier sequence differ by less than a third amount.

18. The apparatus as claimed in claim 1, in which the object is a vehicle.

19. The apparatus as claimed in claim 18, in which the vehicle is an automobile.

20. The apparatus as claimed in claim 18, in which the processor records at (a) and compares at (b) at least one of an ignition key in use, a seat memory in use, a door used, a window position, a mirror position, a transmission setting, a seat occupancy or weight, an entertainment channel selected, an external temperature, an internal temperature, a rain sensor output, an axle loading, a towbar usage, traffic reports, a pollution level, and a ventilation system setting.

21. The apparatus as claimed in claim 1, in which the processor is arranged to perform (d) by deriving a respective prediction from the retrieved sightings of each of the matching sequences.

22. The apparatus as claimed in claim 1, in which the processor is arranged to perform (d) by deriving as the at least one prediction the behavior of the object following the sightings of the at least some matching sequences.

23. The apparatus as claimed in claim 1, in which the future behavior comprises at least one possible future location of the object.

24. The apparatus as claimed in claim 23, in which the at least one possible future location comprises at least one possible future destination.

25. The apparatus as claimed in claim 23, in which the at least one possible future location comprises at least one possible future route from the recent sighting sequence.

26. The apparatus as claimed in any one of claim 18, in which the future behavior comprises at least one of speed, stops, braking, acceleration, cornering, fuel consumption, distraction level and tiredness.

27. The apparatus as claimed in claim 1, further comprising an output device for presenting the at least one prediction in human-perceivable form.

28. The apparatus as claimed in claim 1, in which the apparatus is a computer.

29. A method of predicting a future behavior of an object, comprising the steps of:
   (i) periodically recording a location of the object and a current time, at least during some movements of the object, to form a record of sightings;
   (ii) comparing a sequence of recent sightings with earlier recorded sightings from the record to reveal earlier sequences of sightings which match over at least a predetermined distance the sequence of recent sightings such that a journey segment represented by the sequence of recent sightings substantially matches the journey segments represented by the earlier sequences of sightings over at least the predetermined distance;
   (iii) retrieving some subsequent sightings which follow the sightings of at least some of the matching sequences; and
   (iv) deriving at least one prediction of the future behavior from the retrieved sightings.

30. A computer-readable medium containing a program for predicting a future behavior of an object, which when executed by a processor, performs operations comprising:
   (i) periodically recording a location of the object and a current time, at least during some movements of the object, to form a record of sightings;
   (ii) comparing a sequence of recent sightings with earlier recorded sightings from the record to reveal earlier sequences of sightings which match over at least a predetermined distance the sequence of recent sightings such that a journey segment represented by the sequence of recent sightings substantially matches the journey segments represented by the earlier sequences of sightings over at least the predetermined distance;
   (iii) retrieving some subsequent sightings which follow the sightings of at least some of the matching sequences; and
   (iv) deriving at least one prediction of the future behavior from the retrieved sightings.

31. The medium as claimed in claim 30, in which the medium is transmitted across a communication path.

* * * * *

UNITED STATES PATENT AND TRADEMARK OFFICE
CERTIFICATE OF CORRECTION

PATENT NO. : 7,788,027 B2
APPLICATION NO. : 11/574625
DATED : August 31, 2010
INVENTOR(S) : Jones Page 1 of 1

It is certified that error appears in the above-identified patent and that said Letters Patent is hereby corrected as shown below:

Title Page;

In the References Cited (56):

Please insert --5,539,645 A 7/1996 Mandhyan et al.--;

Please insert --6,041,280 A 3/2000 Kohli et al.--;

Please insert --6,314,368 B1 11/2001 Gurmu et al.--;

Please insert --2003/0020816 A1 1/2003 Hunter et al.--;

Please insert --2003/0182246 A1 9/2003 Johnson et al.--;

Please insert --PCT International Search Report dated February 7, 2006--;

Please insert --EP Search Report dated November 12, 2004--.

Signed and Sealed this
Twenty-second Day of March, 2011

David J. Kappos
*Director of the United States Patent and Trademark Office*